US011685264B2

(12) United States Patent
Miura

(10) Patent No.: US 11,685,264 B2
(45) Date of Patent: Jun. 27, 2023

(54) CONTROL DEVICE

(71) Applicant: HONDA MOTOR CO., LTD., Tokyo (JP)

(72) Inventor: Masaya Miura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 17/158,042

(22) Filed: Jan. 26, 2021

(65) Prior Publication Data

US 2021/0237585 A1 Aug. 5, 2021

(30) Foreign Application Priority Data

Jan. 31, 2020 (JP) ................................ 2020-015295

(51) Int. Cl.
*B60L 15/20* (2006.01)
*B60L 3/10* (2006.01)

(52) U.S. Cl.
CPC .............. *B60L 15/20* (2013.01); *B60L 3/104* (2013.01); *B60L 2240/12* (2013.01); *B60L 2240/423* (2013.01); *B60L 2240/461* (2013.01)

(58) Field of Classification Search
CPC ...... B60L 15/20; B60L 3/104; B60L 2240/12; B60L 2240/423; B60L 2240/461; Y02T 10/64; Y02T 10/72
See application file for complete search history.

(56) References Cited

U.S. PATENT DOCUMENTS

2019/0160966 A1* 5/2019 Jung .................. B60L 15/2072

FOREIGN PATENT DOCUMENTS

JP 2007-006681 1/2007
JP 2014-204478 10/2014
JP 2015-056978 3/2015

* cited by examiner

*Primary Examiner* — Alan D Hutchinson
(74) *Attorney, Agent, or Firm* — Amin, Turocy & Watson, LLP

(57) ABSTRACT

A control device includes a torque controller configured to control a torque of a motor that outputs a driving force for traveling of a vehicle, a first vehicle speed acquirer configured to acquire a first vehicle speed based on a speed of wheels of the vehicle, and a second vehicle speed acquirer configured to acquire a second vehicle speed based on a torque output by the motor, in which the torque controller determines a torque of the motor on the basis of either or both of the first vehicle speed and the second vehicle speed.

3 Claims, 9 Drawing Sheets

50
CONTROL DEVICE
52
TARGET TORQUE DETERMINER
54
INVERTER CONTROLLER
56
FIRST VEHICLE SPEED (WHEEL SPEED) ACQUIRER
58
SECOND VEHICLE SPEED (ESTIMATED VEHICLE SPEED)) ACQUIRER
60
REFERENCE VEHICLE SPEED SETTER

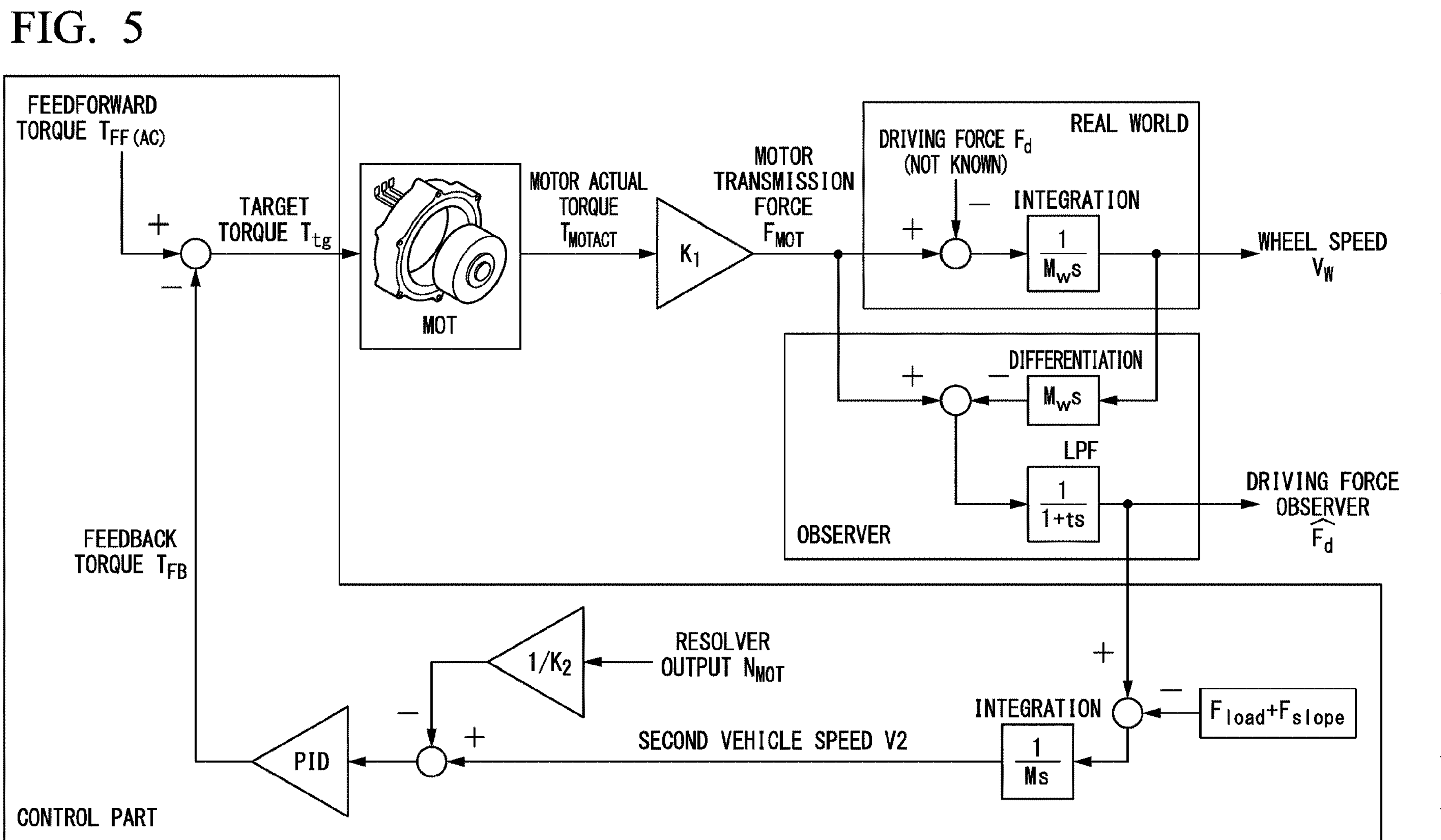

FIG. 5
FEEDFORWARD TORQUE $T_{FF(AC)}$
TARGET TORQUE $T_{tg}$
MOT
MOTOR ACTUAL TORQUE $T_{MOTACT}$
$K_1$
MOTOR TRANSMISSION FORCE $F_{MOT}$
REAL WORLD
DRIVING FORCE $F_d$ (NOT KNOWN)
INTEGRATION
$\frac{1}{M_W s}$
WHEEL SPEED $V_W$
DIFFERENTIATION
$M_W s$
LPF
$\frac{1}{1+ts}$
OBSERVER
DRIVING FORCE OBSERVER $\hat{F}_d$
FEEDBACK TORQUE $T_{FB}$
RESOLVER OUTPUT $N_{MOT}$
$1/K_2$
INTEGRATION
$\frac{1}{Ms}$
$F_{load}+F_{slope}$
SECOND VEHICLE SPEED V2
PID
CONTROL PART SPEED
THIRD VEHICLE SPEED RANGE
SECOND VEHICLE SPEED RANGE
FIRST VEHICLE SPEED RANGE
Th2
Th1
0
t1
t2
V1
V2
Vstd
Vstd (V1)

CONTROL DEVICE

CROSS-REFERENCE TO RELATED APPLICATION

Priority is claimed on Japanese Patent Application No. 2020-015295, filed Jan. 31, 2020, the content of which is incorporated herein by reference.

BACKGROUND

Field of the Invention

The present invention relates to a control device.

Description of Related Art

In recent years, electric vehicles that output a driving force for traveling using a motor have become widespread. Since a motor is an electrical component, its torque response and linearity are extremely high as compared to those of the engines of vehicles that travel using internal combustion engines. It is said that the torque response of a motor is two orders of magnitude higher than that of an engine. For this reason, stable feedback control is possible, and control is also possible, such as outputting an adjustment torque over a short time period when the wheels slip while outputting a torque required by the driver over long time periods.

In addition, with a motor, there is an advantage of being able to accurately ascertain a torque being output in contrast to with an engine. For this reason, a driving force output from the wheel can be accurately estimated, and related information can also be used for traction control.

Therefore, torque control in electric vehicles can be performed with higher accuracy and a higher degree of freedom than in vehicles with engines, and various studies have been conducted on the control of the electric vehicles from a different viewpoint from that of vehicles with engines.

With regard to this, a technology in which a wheel speed sensor is attached to a vehicle and its output is used for speed control has been disclosed (Japanese Unexamined Patent Application, First Publication No. 2015-056978 and Japanese Unexamined Patent Application, First Publication No. 2007-006681). A general wheel speed sensor has a problem that the detection accuracy is lowered in a low speed region. If the detection accuracy of a wheel speed sensor decreases, the accuracy in arithmetic operation of a slip ratio of a wheel also decreases, and thereby it becomes difficult to control the slip ratio. On the other hand, in a technology described in Patent Literature 2, in view of such problems, when a speed of a driving wheel driven by a motor becomes excessive, a regenerative torque of the motor is used to suppress wheel slipping.

In addition, a technology for controlling a drive torque on the basis of an estimated vehicle speed obtained by calculating an estimated vehicle speed from the drive torque of a motor is known (Japanese Unexamined Patent Application, First Publication No. 2014-204478).

SUMMARY

However, in the technology described in Patent Literature 2, since power running and regeneration of the motor are switched over a short period of time, there is a problem that the commercial value is lowered due to a backlash region of a gear (a zero cross region) being straddled, and noise and vibration being generated. In a technology described in Patent Literature 3, if the speed of a vehicle increases, the accuracy of control may decrease due to accumulation of calculation errors such as unintended disturbances.

The present invention has been made in consideration of such circumstances, and one of the objects of the present invention is to provide a control device capable of performing torque control with high accuracy in a wider vehicle speed range.

The control device according to the present invention has adopted the following configuration.

(1): A control device according to one aspect of the present invention includes a torque controller configured to control a torque of a motor that outputs a driving force for traveling of a vehicle, a first vehicle speed acquirer configured to acquire a first vehicle speed based on a speed of wheels of the vehicle, and a second vehicle speed acquirer configured to acquire a second vehicle speed based on a torque output by the motor, in which the torque controller determines a torque of the motor on the basis of either or both of the first vehicle speed and the second vehicle speed.

(2): In the aspect of (1) described above, the torque controller switches from a state of determining a torque of the motor on the basis of the second vehicle speed to a state of determining a torque of the motor on the basis of both the first vehicle speed and the second vehicle speed if a vehicle speed that is the first vehicle speed or the second vehicle speed is equal to or higher than a first threshold value.

(3): In the aspect of (1) described above, the control device further includes a reference vehicle speed setter configured to set a reference vehicle speed on the basis of either or both of the first vehicle speed and the second vehicle speed, in which the torque controller determines a torque of the motor such that a difference between the reference vehicle speed and the first vehicle speed or the second vehicle speed is small, the reference vehicle speed setter sets the reference vehicle speed on the basis of a speed difference adjustment coefficient that adjusts a difference between the reference vehicle speed and the first vehicle speed or a difference between the reference vehicle speed and the second vehicle speed, and sets the speed difference adjustment coefficient such that, as the vehicle speed increases, the difference between the reference vehicle speed and the first vehicle speed decreases and the difference between the reference vehicle speed and the second vehicle speed increases.

(4): In the aspect of (3) described above, the reference vehicle speed setter sets the speed difference adjustment coefficient such that the difference between the reference vehicle speed and the second vehicle speed is minimized when the vehicle speed of the vehicle is a first threshold value, and the difference between the reference vehicle speed and the first vehicle speed is minimized when the vehicle speed of the vehicle is a second threshold value that is larger than the first threshold value.

(5): In the aspect of (1) described above, the torque controller determines a torque of the motor in a first period, and the first vehicle speed acquirer calculates the first vehicle speed in a second period longer than the first period.

(6): In the aspect of (4) described above, the first vehicle speed is acquired from driven wheels, the second vehicle speed is acquired from driving wheels connected to the motor, the torque controller determines a torque of the motor in a first period, the first vehicle speed acquirer calculates the first vehicle speed in a second period longer than the first period, and the torque controller determines a torque of the motor on the basis of a speed difference between the driving wheels and the driven wheels when a vehicle speed of the vehicle is equal to or higher than a third threshold value larger than the second threshold value.

(7): In the aspect of (6) described above, the torque controller calculates a ratio of the reference vehicle speed to the first vehicle speed as a slip ratio when a vehicle speed of the vehicle is equal to or higher than the third threshold value, and curb a torque of the motor when the slip ratio exceeds a predetermined value.

According to the aspects of (1) to (7) described above, it is possible to perform torque control with high accuracy in a wider vehicle speed range. This is because a first vehicle speed and a second vehicle speed have different accurate vehicle speed ranges, and torque control with high accuracy becomes possible as a whole by combining the accurate vehicle speed ranges. In addition, even when a sensor such as a wheel speed sensor fails, a sensor output stops, or an abnormal value is output, control that has been conventionally performed at the first vehicle speed can be performed at the second vehicle speed instead, and can be widely used for motor control.

According to the aspect of (2) described above, if a vehicle speed exceeds a first threshold value at which the sensitivity of a wheel speed sensor or the like is improved, since a state of performing torque control on the basis of a second vehicle speed including a calculation error is switched to torque control using a first vehicle speed derived from the wheel speed sensor or the like, it is possible to control the motor with better accuracy without causing the accuracy to deteriorate.

According to the aspect of (3) described above, it is possible to curb a sudden change in torque at a switching timing of torque control.

According to the aspect of (4) described above, since a reference vehicle speed is switched to a first vehicle speed at a second threshold value before the vehicle speed of a vehicle enters a high speed range, it is possible to prevent a sudden change in torque at a high speed after this.

According to the aspect of (5) described above, an amount of data processed by a torque controller is reduced by calculating a first vehicle speed in a second period longer than a first period that is a control period of a motor, and thereby it is possible to reduce a processing load.

According to the aspect of (6) described above, since slip control is performed while torque control is performed using a first vehicle speed whose calculation period is longer than a control period of a motor, slip suppression can be performed while reducing a processing load. In a low speed range, it is possible to perform slip suppression accurately by using a second vehicle speed.

According to the aspect of (7) described above, it is possible to preferably switch between slip suppression control based on a speed ratio of driving wheels to driven wheels and control for reducing a difference between a first vehicle speed and a second vehicle speed in a high speed range.

BRIEF DESCRIPTION OF THE DRAWINGS

FIG. 5 is a diagram for describing a second vehicle speed and a method for determining a target torque using the second vehicle speed.

DESCRIPTION OF EMBODIMENTS

Figure 1:
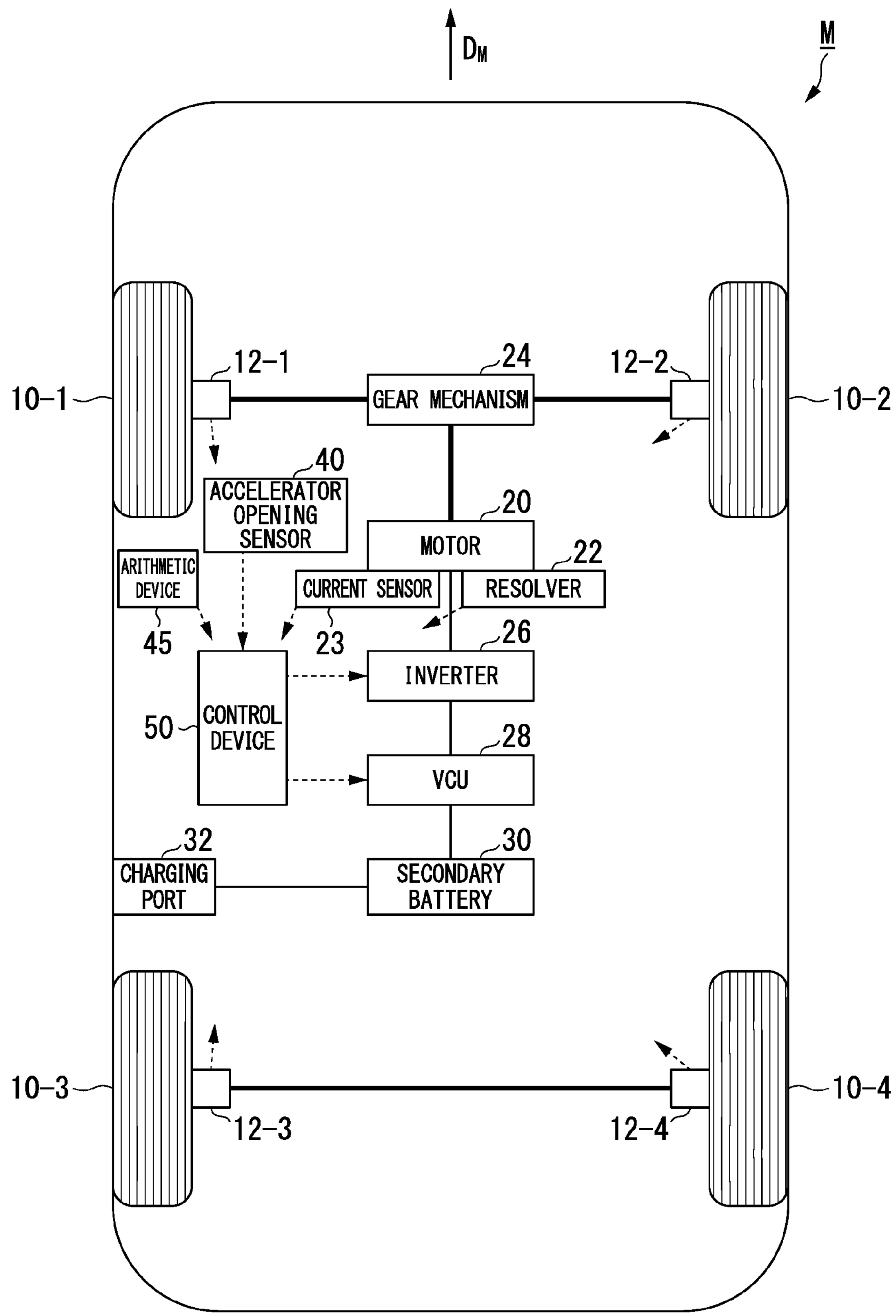
FIG. 1 is a diagram which shows an example of a configuration of a vehicle equipped with a control device.

Hereinafter, embodiments of a control device of the present invention will be described with reference to the drawings. FIG. 1 is a diagram which shows an example of a configuration of a vehicle M equipped with a control device 50. An arrow $D_M$ indicates a forward direction of the vehicle M. The vehicle M is equipped with, for example, four wheels 10-1, 10-2, 10-3, and 10-4. The wheels 10-1 and 10-2 are driving wheels, and wheels 10-3 and 10-4 are driven wheels (that is, the vehicle M is a front-wheel drive vehicle). The vehicle M may also be a rear-wheel drive vehicle.

Corresponding to each wheel, wheel speed sensors 12-1, 12-2, 12-3, and 12-4 that detect the speed of the wheels are attached to the vehicle M. The symbols following the hyphen respectively indicate corresponding wheels. When the corresponding wheels do not need to be distinguished from each other, the symbols following the hyphen will be omitted. The wheel speed sensor 12 detects a passage of irregularities provided on a member that rotates in conjunction with the wheel 10 by detecting a change in magnetic flux using a coil, and outputs a pulse signal to an arithmetic device 45 each time the change is detected.

The vehicle M is also equipped with a motor 20, a resolver 22, a current sensor 23, gear mechanism 24, an inverter 26, a voltage control unit (VCU) 28, a secondary battery 30, a charging port 32, an accelerator opening sensor 40, an arithmetic device 45, and a control device 50. In FIG. 1, it is assumed that the vehicle M is a plug-in type electric vehicle, but the control device can be mounted in any vehicle as long as it is a type of vehicle that drives a driving wheel mainly with power output by the motor. Examples of the type of vehicle include fuel cell vehicles and hybrid vehicles. In many cases, the vehicle M is also equipped with a brake device and a steering device, but illustration and description thereof will be omitted.

The motor 20 outputs a driving force (a torque) to the wheels 10-1 and 10-2 using electric power supplied from the secondary battery via the VCU 28 and the inverter 26. The motor 20 is, for example, a three-phase AC motor. An output shaft of the motor 20 is output to the gear mechanism 24. The gear mechanism 24 includes a shifting function and transmits the driving force output by the motor 20 to the wheels 10-1 and 10-2. An output of the motor 20 may act in a direction in which an acceleration is applied to the vehicle M, or may act in a direction in which a deceleration is applied to the vehicle M. The resolver 22 detects a physical event for detecting the rotational speed of the motor 20, and outputs a result of the detection to the control device 50. The physical event is, for example, a change in a magnetic field generated according to a rotation position of a rotor of the motor 20. In general, the resolver 22 has better detection accuracy and detection speed than those of the wheel speed sensor 12, and is used for motor control that can be controlled with high response. The current sensor 23 is provided to detect a torque output by the motor 20, detects an amount of current (a current value) flowing through the motor 20, and outputs a result of the detection to the control device 50.

The inverter 26 converts direct current electric power supplied from the VCU 28 into, for example, a three-phase alternating current and outputs it to the motor 20. The VCU 28 is, for example, a DC-DC converter. The VCU 28 boosts a voltage of an output terminal of the secondary battery 30 and supplies electric power with the boosted voltage to the inverter 26.

Functions of control device 50 will be described below. The secondary battery 30 is a chargeable and dischargeable battery. The secondary battery 30 is, for example, a lithium ion battery. The secondary battery 30 is connected to the charging port 32 via a cable. A plug attached to a tip of an external cable connected to an external charger of the vehicle M can be mounted in the charging port 32. With the plug mounted in the charging port 32, the secondary battery 30 is charged by the external charger.

The accelerator opening sensor 40 is attached to an accelerator pedal, which is an example of an operator that receives an acceleration instruction by a driver, detects an amount of operation of the accelerator pedal, and outputs a result of the detection to the control device 50 as an accelerator opening degree.

The arithmetic device 45 calculates a speed of the wheel 10-3 and a rotation speed of the wheel 10-4 on the basis of pulse signals input from each of the wheel speed sensors 12-3 and 12-4 attached to the wheels 10-3 and 10-4, which are driven wheels, respectively, calculates the speed of the wheel 10-3 and the speed of the wheel 10-4 on a road plane by multiplying the rotation speed by an assumed radius of the wheel 10, and sets an average of the calculated speeds on a road plane as a first vehicle speed V1. That is, the first vehicle speed V1 is a speed of the driven wheels (an example of a speed based on the speed of the wheels).

Figure 2:
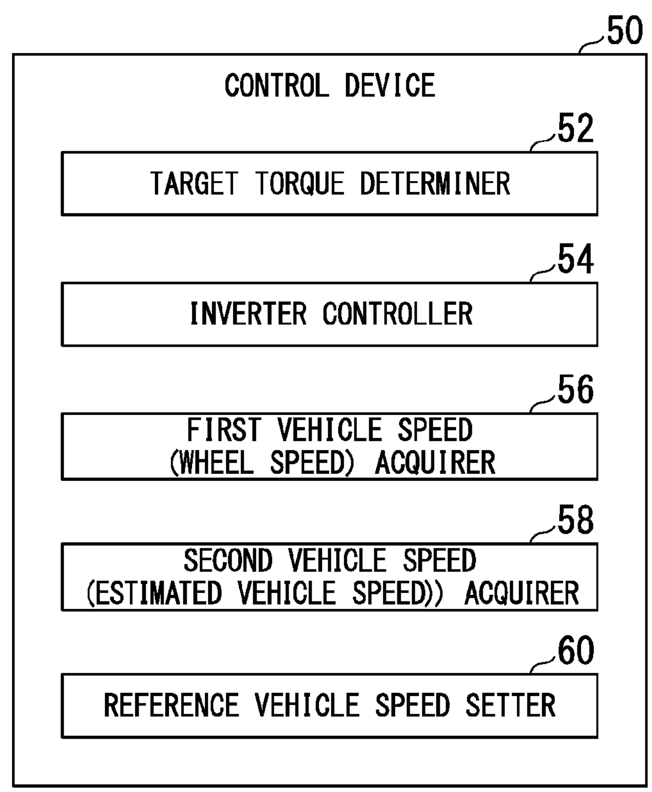
FIG. 2 is a diagram which shows an example of a functional configuration of the control device.

FIG. 2 is a diagram which shows an example of a functional configuration of the control device 50. The control device 50 includes, for example, a target torque determiner 52, an inverter controller 54, a first vehicle speed acquirer 56, a second vehicle speed acquirer 58, and a reference vehicle speed setter 60. The target torque determiner 52 is an example of a "torque controller." These components are realized by, for example, a hardware processor such as a central processing unit (CPU) executing a program (software). In addition, some or all of these components may be realized by hardware (circuit units; including circuitry) such as Large Scale Integration (LSI), an Application Specific Integrated Circuit (ASIC), a Field-Programmable Gate Array (FPGA), and a Graphics Processing Unit (GPU), or may also be realized by a cooperation of software and hardware.

The target torque determiner 52 determines a target torque Ttg to be output by the motor 20. The target torque determiner 52 determines the target torque Ttg on the basis of, for example, Equation (1). In the equation, $T_{FF}$ (AC) is a feedforward torque determined on the basis of accelerator opening AC. The target torque determiner 52 determines the feedforward torque $T_{FF}$ (AC) by applying the speed of the vehicle M (which may also be any vehicle speed described below) and the accelerator opening degree AC to a predetermined map. The feedforward torque $T_{FF}$ (AC) tends to increase as the accelerator opening AC increases. $T_{FB}$ is a feedback torque determined on the basis of the first vehicle speed, a second vehicle speed, and a reference vehicle speed described below. This will be described below.

$$Ttg=T_{FF}(AC)-T_{FS} \quad (1)$$

The inverter controller 54 controls the inverter 26 such that the target torque Ttg determined by the target torque determiner 52 is output.

The target torque determiner 52 determines the target torque Ttg using different rules in each case of a first vehicle speed range in which the vehicle speed of the vehicle M (which may be any of the first vehicle speed, the second vehicle speed, and a weighted sum of these speeds to be described below) Vref is less than a first threshold value Vth1, a second vehicle speed range in which the speed of the vehicle M is equal to or higher than the first threshold value Vth1 and lower than a second threshold value Vth2, a third vehicle speed range in which the vehicle speed Vref is equal to or higher than the second threshold value Vth2 and lower than a third threshold value Vth3, and a fourth vehicle speed range in which the vehicle speed Vref is equal to or higher than the third threshold value Vth3. Vth1<Vth2<Vth3 holds.

Figure 3:
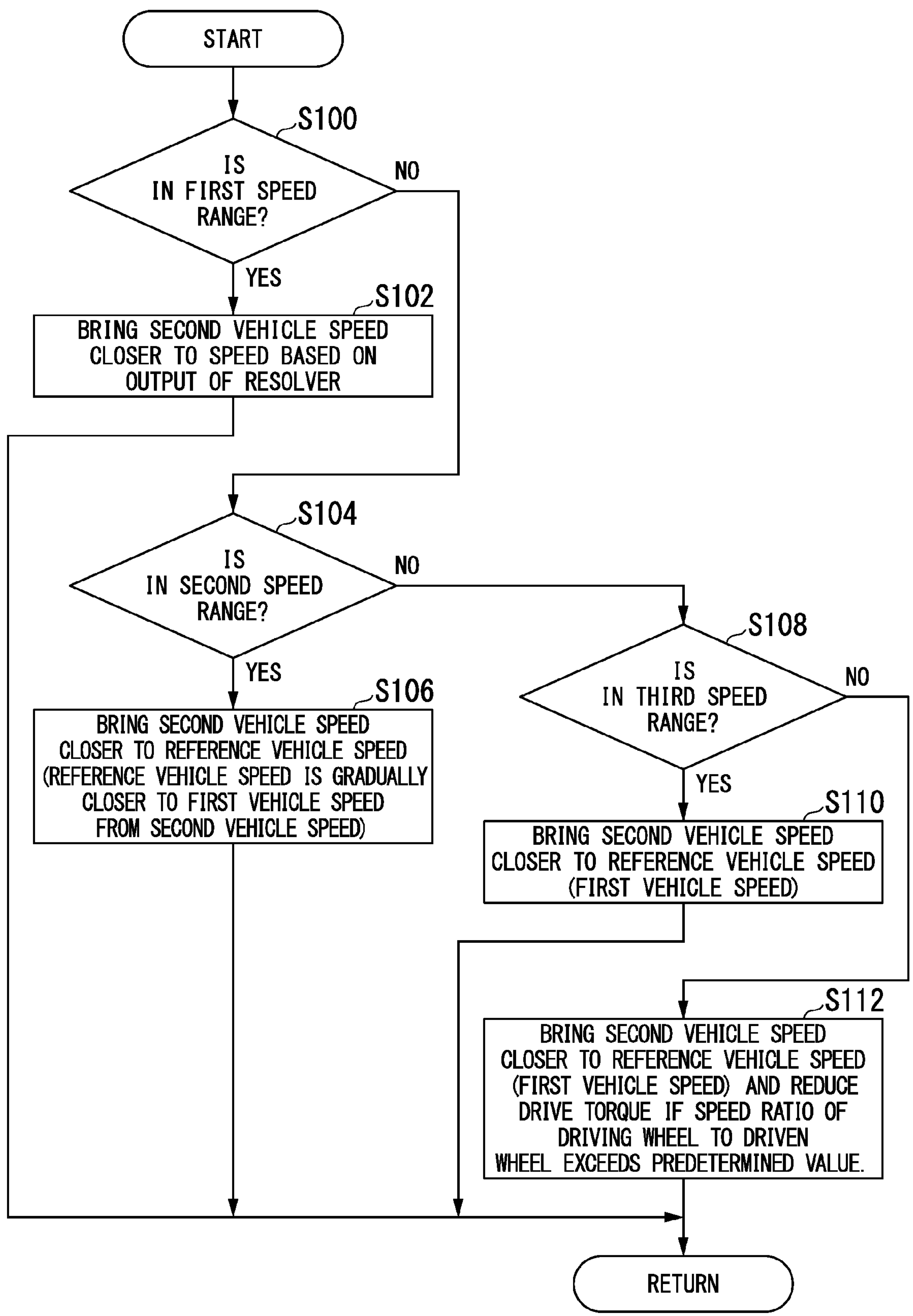
FIG. 3 is a flowchart which shows an outline of determination processing for a feedback torque determined by a target torque determiner.

FIG. 3 is a flowchart which shows an outline of determination processing of feedback torque $T_{FB}$ determined by the target torque determiner 52. Only the outline will be described herein, and specific content of processing of each step will be described below.

First, the target torque determiner 52 determines whether the vehicle speed Vref is in the first vehicle speed range (step S100). The first vehicle speed range is, for example, a vehicle speed range of about 2 to 5 [km/h], and is a low speed range in which sensitivity of the wheel speed sensor 12 deteriorates.

Figure 4:
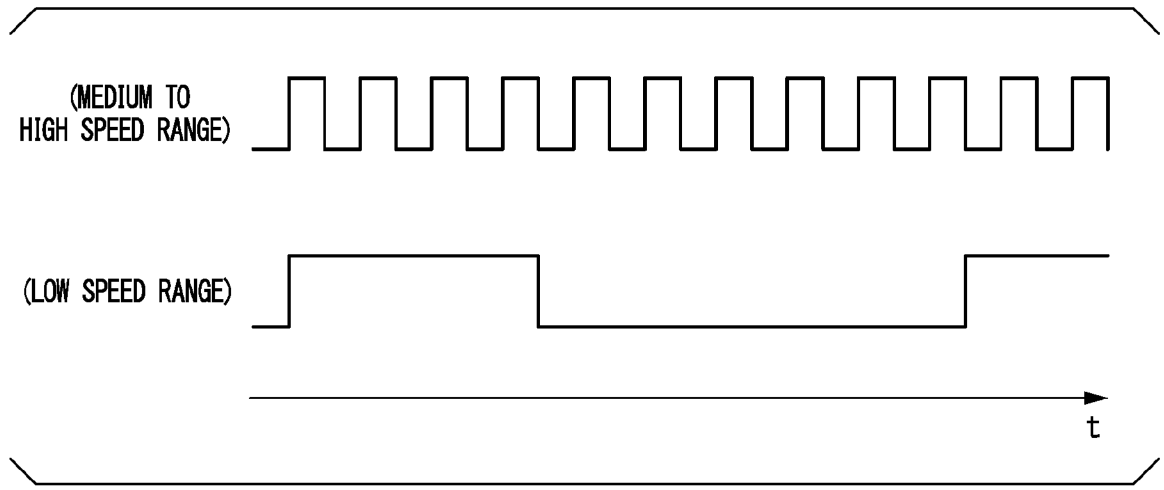
FIG. 4 is a diagram for describing a phenomenon in which sensitivity of a wheel speed sensor deteriorates.

FIG. 4 is a diagram for explaining a phenomenon in which the sensitivity of the wheel speed sensor 12 deteriorates. Pulse signals each corresponding to a "medium to high speed range" and a "low speed range" shown in FIG. 4 indicate the pulse signals output by the wheel speed sensor 12. In the medium to high speed range, since a time interval between rising and falling of the pulse signal is sufficiently small, and, if the speed of the vehicle M changes, a period (a frequency) of the pulse signal changes to an extent that it can be detected, the speed of the vehicle M can be detected with high sensitivity. On the other hand, in the low speed range, since the time interval between the rising and falling of the pulse signal is long, even if the speed of the vehicle M changes between the rising and falling, or between the falling and rising, no information for detecting a speed change can be obtained until next rising or falling arrives. For this reason, it can be said that the sensitivity of the wheel speed sensor 12 deteriorates in the low speed range.

When it is determined that the vehicle speed Vref is in the first vehicle speed range, the target torque determiner 52 determines the feedback torque TFB such that a second vehicle speed V2 acquired by the second vehicle speed acquirer 58 is closer to a speed Vrs based on an output of the resolver 22 (a value obtained by multiplying the output of the resolver 22 to be described below by an coefficient) (step S102). The second vehicle speed acquirer 58 acquires the second vehicle speed V2 by, for example, performing an arithmetic operation to be described below. The second vehicle speed range is, for example, a vehicle speed range from an upper limit of the first vehicle speed range (5 [km/h] in the example described above) to 10 to 20 [km/h], and is a vehicle speed range in which the sensitivity of the wheel speed sensor 12 is better than that of the first vehicle speed range.

When a negative result of the determination is obtained in step S100, the target torque determiner 52 determines whether the vehicle speed Vref is in the second vehicle speed range (step S104). When it is determined that the vehicle speed Vref is in the second vehicle speed range, the target torque determiner 52 determines the feedback torque $T_{FB}$ such that the second vehicle speed V2 is closer to a reference vehicle speed Vstd set by the reference vehicle speed setter 60 (step S106). In the second vehicle speed range, the reference vehicle speed Vstd is set to be gradually closer to the first vehicle speed V1 based on the output of the wheel speed sensor 12 from the second vehicle speed V2.

When a negative result of the determination is obtained in step S104, the target torque determiner 52 determines whether the vehicle speed Vref is in the third vehicle speed range (step S108). The third vehicle speed range is, for example, a medium speed range from an upper limit of the second vehicle speed range (10 to 20 [km/h] in the example described above) to 20 to 40 [km/h]. When it is determined that the vehicle speed Vref is in the third vehicle speed range, the target torque determiner 52 determines the feedback torque $T_{FB}$ such that the second vehicle speed V2 is closer to the reference vehicle speed Vstd set by the reference vehicle speed setter 60 (step S110). In the third vehicle speed range, the first vehicle speed V1 is set to the reference vehicle speed Vstd.

When a negative result of the determination is obtained in step S108 (that is, when it is determined that the vehicle speed Vref is in the fourth vehicle speed range), the target torque determiner 52 determines the feedback torque $T_{FB}$ such that the second vehicle speed V2 is closer to the reference vehicle speed Vstd, and a drive torque is reduced if a speed difference between the driving wheel and the driven wheel exceeds a predetermined value (step S112). In the fourth vehicle speed range, the first vehicle speed V1 is set to the reference vehicle speed Vstd.

The first vehicle speed acquirer 56 acquires the first vehicle speed V1 from, for example, the arithmetic device 45. As another example of the speed based on the speed of the wheel, the first vehicle speed acquirer 56 may acquire or obtain the first vehicle speed V1 on the basis of a rotation speed of a vehicle shaft, a rotation speed of a rotating member in the gear mechanism 24, and the like. In addition, the first vehicle speed acquirer 56 may perform the same arithmetic operation as the arithmetic device 45 by itself.

The second vehicle speed acquirer 58 acquires the second vehicle speed V2 on the basis of the target torque Ttg. In the following description, a method for determining the second vehicle speed V2 and processing of step S102 in FIG. 3 will be described together. FIG. 5 is a diagram for describing the second vehicle speed V2 and the method for determining the target torque Ttg using the second vehicle speed V2. The second vehicle speed V2 is a speed acquired by an arithmetic operation using a driving force observer.

The second vehicle speed acquirer 58 calculates a motor actual torque $T_{MOTACT}$ output from the motor 20 when the target torque Ttg obtained by subtracting the feedback torque $T_{FB}$ from a ford forward torque $T_{FF}$ $(_{AC})$ is given to the motor 20. The second vehicle speed acquirer 58 calculates the motor actual torque $T_{MOTACT}$ on the basis of, for example, an output of the current sensor 23. Furthermore, the second vehicle speed acquirer 58 calculates a motor transmission force $F_{MOT}$ by multiplying the motor actual torque $T_{MOTACT}$ by a coefficient K1. The coefficient K1 is a value obtained by multiplying a gear ratio g by a transmission efficiency η from the motor 20 to the foot shaft and dividing a result by a radius r of the wheel 10.

The second vehicle speed acquirer 58 fits a value calculated by dividing a value obtained by subtracting an unknown driving force Fd from the motor transmission force $F_{MOT}$ by Mω and then integrating results into an observable wheel speed Vω. The wheel speed Vω may be the same as the first vehicle speed V1, or may be a speed calculated by a different method. Mω is equal to $J/(r^2)$, and J is inertia (moment of inertia) of tire shaft conversion.

The second vehicle speed acquirer 58 calculates a driving force observer Fd (hat) by subtracting a value, obtained by multiplying an estimated wheel speed Vω by Mω and differentiating a result, from the motor transmission force $F_{MOT}$ and causing it to pass through a low pass filter (LPF) represented by $\{1/1+\tau s\}$. τ is a time constant.

The second vehicle speed acquirer 58 causes the driving force observer Fd (hat) to feedback as an unknown driving force Fd, and calculates the second vehicle speed (an estimated vehicle speed) V2 by dividing a value, obtained by subtracting a traveling resistance Fload and a gradient resistance Fslope from the driving force observer Fd (hat), by a vehicle weight M and integrating results. The traveling resistance Fload is obtained by, for example, applying the vehicle speed Vref to a map, and the gradient resistance Fslope is obtained by, for example, observing changes in the target torque Ttg and the vehicle speed Vref. The second vehicle speed V2 is an example of "the second vehicle speed based on a torque output by the motor."

The target torque determiner 52 determines the feedback torque $T_{FB}$ by performing feedback control such as PID control such that the second vehicle speed V2 is closer to a value obtained by multiplying $N_{MOT}$, which is the output of the resolver 22, by (1/K2). The coefficient K2 is a value obtained by dividing the gear ratio g by the radius r of the wheel 10. As a result, a current second vehicle speed V2 is calculated and updated at any time by feedback control. The processing corresponds to the processing of step S102 in FIG. 3. The target torque determiner 52 may perform PI control, may perform P control, or may also perform other types of feedback control instead of PID control.

Figure 6:
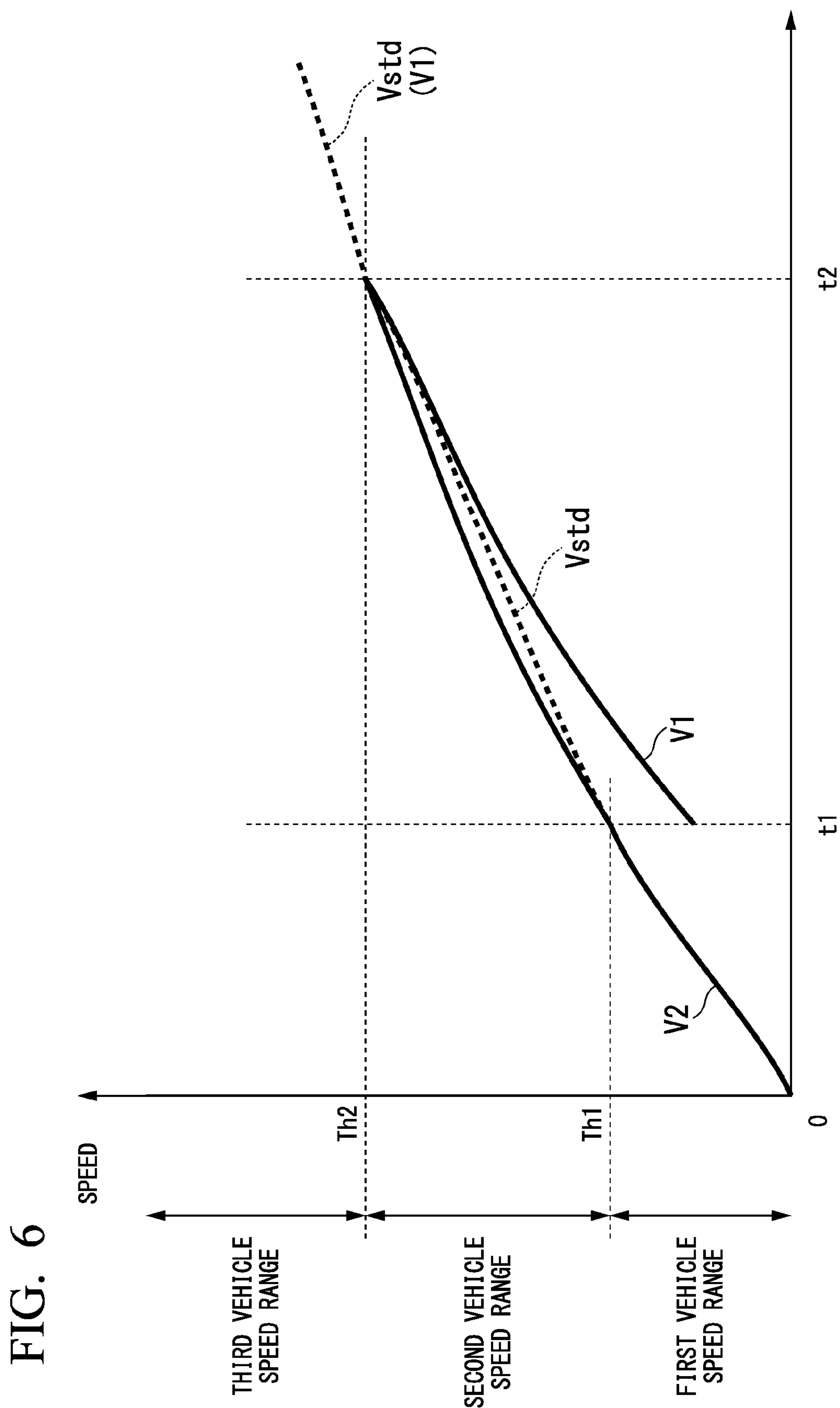
FIG. 6 is a diagram for describing a transition of a reference vehicle speed when the reference vehicle speed shifts from a first vehicle speed range to a second vehicle speed range or a third vehicle speed range.

FIG. 6 is a diagram for describing a transition of a reference vehicle speed when the reference vehicle speed shifts from the first vehicle speed range to the second vehicle speed range or the third vehicle speed range. In the first vehicle speed range in which the vehicle speed Vref is lower than the first threshold value Vth1, the reference vehicle speed Vstd is not set (or even if it is set, it is not used for control). Control of the fourth vehicle speed range will be described below.

Figure 7:
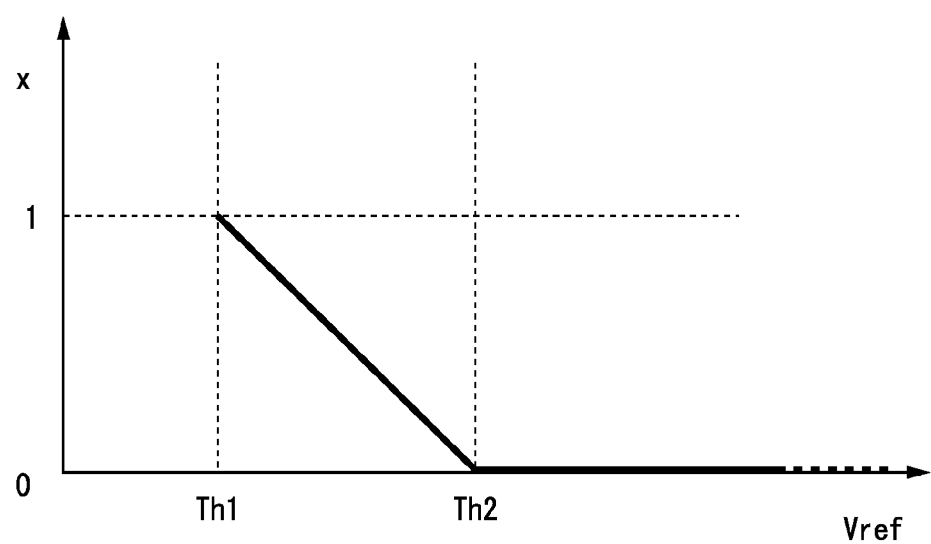
FIG. 7 is a diagram which shows an example of a map for determining a coefficient.

The reference vehicle speed setter 60 sets the reference vehicle speed Vstd on the basis of Equation (2) if the vehicle speed Vref is equal to or higher than the first threshold value and enters the second vehicle speed range. x is a coefficient (an example of a "speed difference adjustment coefficient") having a value between 0 and 1, and is determined on the basis of, for example, the map shown in FIG. 7. FIG. 7 is a diagram which shows an example of a map for determining the coefficient x. The reference vehicle speed setter 60 sets the coefficient x to 1 when the vehicle speed Vref matches the first threshold value Th1, sets it to be closer to 1 as the vehicle speed Vref approaches the first threshold value Th1 or sets it to be closer to 0 as the vehicle speed Vref approaches the second threshold value Th2 when the vehicle speed Vref is between the first threshold value Th1 and the second threshold value Th2, and sets it to 0 when vehicle speed Vref matches the second threshold value Th2. In other words, the reference vehicle speed setter 60 sets the coefficient x to 1 when the vehicle speed Vref matches the first threshold value Th1 and sets the coefficient x such that it is gradually closer to 0 as the vehicle speed Vref approaches the second threshold value Th2 when the vehicle speed Vref is between the first threshold value Th1 and the second threshold value Th2. In FIG. 7, it is shown that the coefficient x changes linearly with respect to a change of the vehicle speed Vref, but the coefficient x may change in a curved shape or a step shape with respect to the change of the vehicle speed Vref.

$$Vstd = x \times V1 + (1-x) \times V2 \quad (2)$$

As a result, the reference vehicle speed setter 60 sets the reference vehicle speed Vstd to the second vehicle speed V2 when the vehicle speed Vref is the first threshold value Th1, sets it to a weighted sum of the first vehicle speed V1 and the second vehicle speed V2 and a weighted sum in which a ratio of the first vehicle speed V1 is increased as the vehicle speed Vref approaches the second threshold value Th2 when the vehicle speed Vref is between the first threshold value Th1 and the second threshold value Th2, and sets it to the first vehicle speed V1 when the vehicle speed Vref is the second threshold value Th2.

As described above, the reference vehicle speed Vstd is not set in the first vehicle speed range in which the vehicle speed Vref is lower than the first threshold value Vth1. As a result, accurate control is possible by using the second vehicle speed even in a region in which the sensitivity of the wheel speed sensor 12 is poor. In addition, in the second vehicle speed range or higher, when a sensor such as the wheel speed sensor 12 fails, a sensor output stops, or an abnormal value is output, the second vehicle speed can be used instead. As a result, it is possible to perform torque control with high accuracy in a wider vehicle speed range. This is because the first vehicle speed V1 and the second vehicle speed V2 have different accurate vehicle speed ranges, and it is possible to perform torque control with high accuracy as a whole by combining the accurate vehicle speed ranges.

In addition, when the vehicle speed Vref is between the first threshold value Th1 and the second threshold value Th2, it is possible to curb a sudden change in torque at a torque control switching timing (between the first vehicle speed range and the second vehicle speed range, and between the second vehicle speed range and the third vehicle speed range) by setting the weighted sum to set the reference vehicle speed Vstd. Moreover, since the reference vehicle speed Vstd is fixed to the first vehicle speed V1 between the second vehicle speed range and the third vehicle speed range, it is possible to prevent a sudden change in torque at high speed after this.

As described above, the target torque determiner 52 determines the feedback torque $T_{FB}$ such that the second vehicle speed V2 is closer to the reference vehicle speed Vstd in the second vehicle speed range, the third vehicle speed range, and the fourth vehicle speed range. The method for determining the feedback torque $T_{FB}$ is expressed by, for example, Equation (3). The target torque determiner 52 may perform the PI control, may perform the P control, or may also perform other types of feedback control instead of the PID control.

$$T_{FB} = PID(Vstd, V2) \quad (3)$$

In this manner, when the vehicle speed Vref is equal to or higher than the first threshold value Th1, the target torque determiner 52 switches from a state of determining the target torque Ttg on the basis of the second vehicle speed V2 to a state of determining the target torque Ttg on the basis of both the first vehicle speed V1 and the second vehicle speed V2.

The reference vehicle speed setter 60 may set (in other words, change or switch) the coefficient x related to the setting of the reference vehicle speed Vstd described in FIGS. 6 and 7 in synchronization with a reception interval of CAN communication. The control device 50 acquires, for example, the first vehicle speed V1 from the arithmetic device 45 connected to the accelerator opening sensor 40 or the wheel speed sensor 12. Communication between the arithmetic device and the control device 50 is performed by, for example, CAN communication. Due to a communication speed of the CAN communication, a period in which the control device 50 determines the target torque Ttg (that is, a control period of the motor 20) is shorter than an acquisition period of the first vehicle speed V1. In other words, the acquisition period of the first vehicle speed V1 is longer than the control period of the motor 20. For this reason, the reference vehicle speed setter 60 performs processing to be described below.

Figure 8:
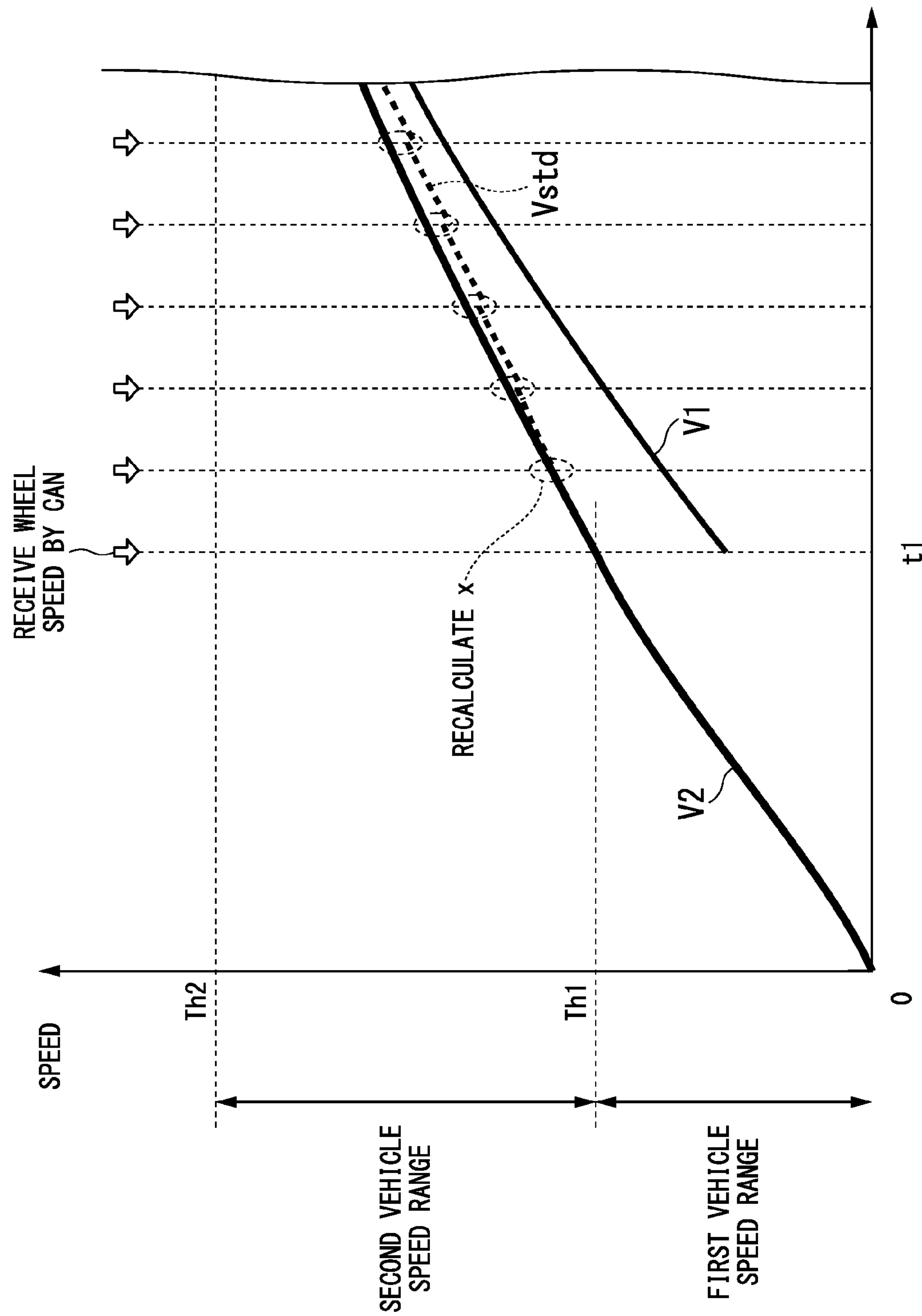
FIG. 8 is a diagram for describing content of detailed processing by a reference vehicle speed setter.

FIG. 8 is a diagram for describing content of detailed processing by the reference vehicle speed setter 60. The pulse signal (the number of pulses) from the wheel speed sensor 12 is input to the control device 50 at a reception interval (an example of a predetermined interval) of the CAN communication. The first vehicle speed acquirer 56 calculates the first vehicle speed in response to an input of the pulse signal. The reception interval of the CAN communication is, for example, about 30 to 60 [ms] (an example of a "second period"), and is longer than the control period of the motor 20 (for example, 3 to 8 [ms]; an example of a "first period"). A target torque is determined according to the control period of the motor 20. As shown in FIG. 8, the reference vehicle speed setter 60 fixes the coefficient x during the reception interval of the CAN communication, and recalculates the coefficient x each time a pulse signal is received by the CAN communication. By performing calculation such that an interval shorter than the reception interval of the CAN communication is compensated for by this coefficient x, a calculation load can be reduced as compared with when performing a calculation on the basis of a reference speed for each control period of the motor 20. That is, an amount of data to be processed by the target torque determiner 52 is reduced by performing a calculation of the first vehicle speed V1 in the second period, which is longer than the first period that is the control period of the motor 20, and thereby the processing load can be reduced.

Control in the fourth vehicle speed range will be described. In the fourth vehicle speed range, the target torque determiner 52 calculates a slip ratio based on the speed difference between the driven wheel and the driving wheel, and determines the target torque Ttg by reflecting a component for slip suppression. The target torque determiner 52 performs the following calculation with the first vehicle speed V1 set as the speed of the driven wheel and the reference vehicle speed Vstd (corresponding to the second vehicle speed V2 in the fourth vehicle speed range) set as the speed of the driving wheel. As shown in Equation (4), the target torque determiner 52 calculates a ratio of the first vehicle speed V1 and the reference vehicle speed Vstd as a slip ratio γ.

$$\gamma = Vref / \{1 - (Vstd - V2)\} \quad (4)$$

When the slip ratio γ exceeds a predetermined value A1, the target torque determiner 52 determines the feedback torque $T_{FB}$ by a method expressed by Equation (5) instead of the method for determining the feedback torque $T_{FB}$ described in Equation (3). In the equation, $f(\gamma)$ is a function whose output value increases as $\gamma$ increases.

$$T_{FB}=f(\gamma) \tag{5}$$

Figure 9:
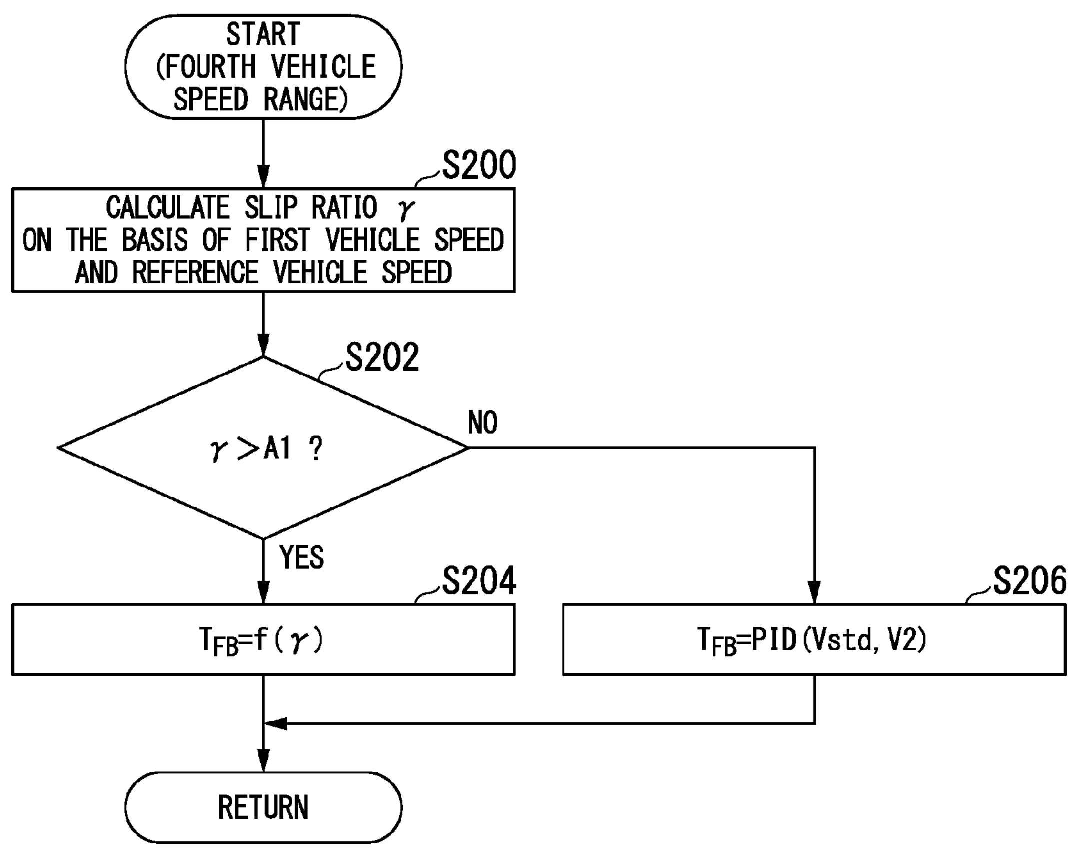
FIG. 9 is a flowchart which shows an example of content of processing executed by a target torque determiner when a reference speed of a vehicle is in a fourth vehicle speed range.

FIG. 9 is a flowchart which shows an example of content of processing executed by the target torque determiner 52 when the vehicle speed Vref of the vehicle M is in the fourth vehicle speed range. Processing of this flowchart shows content of processing of step S112 in FIG. 3 in more detail.

The target torque determiner 52 calculates the slip ratio γ on the basis of the first vehicle speed V1 and the reference vehicle speed Vstd (step S200), and determines whether the slip ratio γ exceeds the predetermined value A1 (step S202). The target torque determiner 52 determines the feedback torque $T_{FB}$ on the basis of the slip ratio γ when the slip ratio γ exceeds the predetermined value A1 (step S204), and determines the feedback torque $T_{FB}$ such that the second vehicle speed V2 is closer to the reference vehicle speed Vstd when the slip ratio γ does not exceed the predetermined value A1 (step S206).

According to this processing, since slip suppression is performed while torque control is performed using the first vehicle speed V1 whose calculation period is longer than the control period of the motor in the fourth vehicle speed range that is a high speed range, slip suppression can be performed while reducing the processing load on the target torque determiner 52. In the first vehicle speed range that is a low speed range, accurate slip suppression can be performed by using the second vehicle speed V2.

According to the control device of the embodiment described above, the control device includes the target torque determiner 52 that determines the target torque Ttg given to the motor 20 that outputs a driving force for traveling of the vehicle M, the first vehicle speed acquirer 56 that acquires the first vehicle speed V1 based on the speed of the wheels of the vehicle M, and the second vehicle speed acquirer 58 that determines the second vehicle speed V2 on the basis of a torque output by the motor 20, and since the target torque determiner 52 determines the target torque Ttg on the basis of either or both of the first vehicle speed V1 and the second vehicle speed V2, it is possible to perform torque control with high accuracy in a wider vehicle speed range. That is, accurate control is possible by using the second vehicle speed even in a first speed region in which the sensitivity of the wheel speed sensor 12 is poor, and, when a sensor such as the wheel speed sensor 12 fails, a sensor output stops, or an abnormal value is output in the second vehicle speed range or above, the second vehicle speed can be used instead. Since the first vehicle speed V1 and the second vehicle speed V2 have different accurate vehicle speed ranges, it is possible to perform torque control with high accuracy as a whole by combining the accurate vehicle speed ranges.

Although a mode for carrying out the present invention has been described using the embodiment, the present invention is not limited to the embodiment, and various modifications and substitutions can be made in a range not departing from the gist of the present invention.

What is claimed is:

1. A control device comprising:

a torque controller configured to control a torque of a motor that outputs a driving force for traveling of a vehicle;

a first vehicle speed acquirer configured to acquire a first vehicle speed based on a speed of wheels of the vehicle;

a second vehicle speed acquirer configured to acquire a second vehicle speed based on a torque output by the motor; and a reference vehicle speed setter configured to set a reference vehicle speed on the basis of either or both of the first vehicle speed and the second vehicle speed, wherein the torque controller determines a torque of the motor on the basis of either or both of the first vehicle speed and the second vehicle speed, the torque controller determines a torque of the motor such that a difference between the reference vehicle speed and the first vehicle speed or the second vehicle speed is small, and the reference vehicle speed setter sets the reference vehicle speed on the basis of a speed difference adjustment coefficient that adjusts a difference between the reference vehicle speed and the first vehicle speed or a difference between the reference vehicle speed and the second vehicle speed, and sets the speed difference adjustment coefficient such that, as the vehicle speed increases, the difference between the reference vehicle speed and the first vehicle speed decreases and the difference between the reference vehicle speed and the second vehicle speed increases, wherein the reference vehicle speed setter sets the speed difference adjustment coefficient such that the difference between the reference vehicle speed and the second vehicle speed is minimized when the vehicle speed of the vehicle is a first threshold value, and the difference between the reference vehicle speed and the first vehicle speed is minimized when the vehicle speed of the vehicle is a second threshold value that is larger than the first threshold value, and wherein the first vehicle speed is acquired from driven wheels, the second vehicle speed is acquired from driving wheels connected to the motor, the torque controller determines a torque of the motor in a first period, the first vehicle speed acquirer calculates the first vehicle speed in a second period longer than the first period, and the torque controller determines a torque of the motor on the basis of a speed ratio of the driving wheels to the driven wheels when a vehicle speed of the vehicle is equal to or higher than a third threshold value larger than the second threshold value.

2. The control device according to claim 1, wherein the torque controller switches from a state of determining a torque of the motor on the basis of the second vehicle speed to a state of determining a torque of the motor on the basis of both the first vehicle speed and the second vehicle speed if a vehicle speed that is the first vehicle speed or the second vehicle speed is equal to or higher than a first threshold value.

3. The control device according to claim 1, wherein the torque controller calculates a ratio of the reference vehicle speed to the first vehicle speed as a slip ratio when a vehicle speed of the vehicle is equal to or higher than the third threshold value, and curb a torque of the motor when the slip ratio exceeds a predetermined value.

* * * * *